(12) United States Patent
Beisel

(10) Patent No.: US 10,927,831 B2
(45) Date of Patent: Feb. 23, 2021

(54) MONITORING SYSTEM FOR PRESSURE PUMP CAVITATION

(71) Applicant: Halliburton Energy Services, Inc., Houston, TX (US)

(72) Inventor: Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 266 days.

(21) Appl. No.: 15/743,178

(22) PCT Filed: Sep. 4, 2015

(86) PCT No.: PCT/US2015/048696
§ 371 (c)(1),
(2) Date: Jan. 9, 2018

(87) PCT Pub. No.: WO2017/039701
PCT Pub. Date: Mar. 9, 2017

(65) Prior Publication Data
US 2019/0120225 A1 Apr. 25, 2019

(51) Int. Cl.
*F04B 51/00* (2006.01)
*F04B 49/06* (2006.01)
(Continued)

(52) U.S. Cl.
CPC ............ *F04B 51/00* (2013.01); *F04B 47/02* (2013.01); *F04B 49/03* (2013.01); *F04B 49/065* (2013.01);
(Continued)

(58) Field of Classification Search
CPC .......... F04B 51/00; F04B 47/02; F04B 53/10; F04B 49/03; F04B 49/065; F04B 49/22; G01B 21/32
See application file for complete search history.

(56) References Cited

U.S. PATENT DOCUMENTS 3,921,435 A 11/1975 Howard
4,333,424 A * 6/1982 McFee ............... F02B 33/02
123/39
(Continued)

FOREIGN PATENT DOCUMENTS

WO 2011095935 8/2011
WO 2017039692 3/2017
(Continued)

OTHER PUBLICATIONS

International Patent Application No. PCT/US2015/048588 , "International Search Report and Written Opinion", dated May 4, 2016.
(Continued)

*Primary Examiner* — Peter J Bertheaud
*Assistant Examiner* — Dnyanesh G Kasture
(74) *Attorney, Agent, or Firm* — Kilpatrick Townsend & Stockton LLP

(57) ABSTRACT

A monitoring system may include a position sensor, strain gauges, and a computing device for monitoring valves in a wellbore pressure pump having multiple chambers to determine cavitation in the fluid end of the wellbore pressure pump using strain measurements for each chamber. The strain gauges may determine strain in each chamber of the pressure pump. The position sensor may determine the position of a crankshaft mechanically coupled to a plunger in each chamber. The computing device may receive signals generated by the strain gauges and the position sensor related to the strain in each chamber and the position of the crankshaft, respectively, and may process the signals to determine delays in the actuation of the valves for identifying cavitation and distinguishing cavitation conditions from alternative conditions in the fluid end.

19 Claims, 8 Drawing Sheets

(51) Int. Cl.
*F04B 49/22* (2006.01)
*F04B 47/02* (2006.01)
*F04B 53/10* (2006.01)
*F04B 49/03* (2006.01)
*G01B 21/32* (2006.01)

(52) U.S. Cl.
CPC .............. *F04B 49/22* (2013.01); *F04B 53/10* (2013.01); *G01B 21/32* (2013.01)

(56) References Cited

U.S. PATENT DOCUMENTS

| | | | |
|---|---|---|---|
| 4,705,459 A * | 11/1987 | Buisine | F04B 51/00 417/53 |
| RE33,649 E | 7/1991 | Kawai | |
| 5,846,056 A | 12/1998 | Dhindsa et al. | |
| 6,155,347 A | 12/2000 | Mills | |
| 6,859,740 B2 * | 2/2005 | Stephenson | F04B 51/00 702/35 |
| 6,882,960 B2 | 4/2005 | Miller et al. | |
| 7,043,975 B2 | 5/2006 | Du | |
| 7,623,986 B2 | 11/2009 | Miller et al. | |
| 8,807,960 B2 | 8/2014 | Stephenson et al. | |
| 9,759,213 B2 | 9/2017 | Bassett et al. | |
| 10,480,296 B2 | 11/2019 | Beisel | |
| 10,564,020 B2 | 2/2020 | Beisel | |
| 2002/0007952 A1 | 1/2002 | Vann | |
| 2002/0176784 A1 | 11/2002 | Du | |
| 2004/0018100 A1 | 1/2004 | Takagi et al. | |
| 2004/0144529 A1 | 7/2004 | Barnes et al. | |
| 2004/0158419 A1 | 8/2004 | Pearson et al. | |
| 2005/0180868 A1 | 8/2005 | Miller | |
| 2006/0037408 A1 | 2/2006 | Peter | |
| 2007/0041849 A1 | 2/2007 | Allen | |
| 2007/0139211 A1 | 6/2007 | Pessin et al. | |
| 2007/0140869 A1 | 6/2007 | St. Michel et al. | |
| 2008/0260558 A1 | 10/2008 | Luongo et al. | |
| 2009/0041588 A1 * | 2/2009 | Hunter | F04B 7/0076 417/27 |
| 2009/0129935 A1 | 5/2009 | Kunkler et al. | |
| 2009/0317262 A1 | 12/2009 | Gilpatrick | |
| 2010/0300683 A1 * | 12/2010 | Looper | E21B 21/06 166/250.01 |
| 2011/0046903 A1 | 2/2011 | Franklin | |
| 2012/0144995 A1 | 6/2012 | Bayyouk et al. | |
| 2013/0151216 A1 | 6/2013 | Palka et al. | |
| 2013/0261993 A1 | 10/2013 | Ruchti et al. | |
| 2014/0096957 A1 | 4/2014 | Van Zuilekom et al. | |
| 2014/0166267 A1 | 6/2014 | Weightman et al. | |
| 2014/0288858 A1 | 9/2014 | Franklin | |
| 2015/0027693 A1 | 1/2015 | Edwards et al. | |
| 2016/0305419 A1 * | 10/2016 | Liu | F04B 17/04 |
| 2017/0138645 A1 | 5/2017 | Sakima et al. | |

FOREIGN PATENT DOCUMENTS

| | | |
|---|---|---|
| WO | 2017039695 | 3/2017 |
| WO | 2017039698 | 3/2017 |
| WO | 2017039700 | 3/2017 |

OTHER PUBLICATIONS

International Patent Application No. PCT/US2015/048610 , "International Search Report and Written Opinion", dated May 4, 2016, 9 pages.
International Patent Application No. PCT/US2015/048647 , "International Search Report and Written Opinion", dated May 4, 2016, 8 pages.
International Patent Application No. PCT/US2015/048673 , "International Search Report and Written Opinion", dated Jun. 3, 2016, 15 pages.
International Patent Application No. PCT/US2015/048696 , "International Search Report and Written Opinion", dated May 4, 2016, 8 pages.
U.S. Appl. No. 15/743,405 , "Notice of Allowance", dated Oct. 30, 2019, 9 pages.
U.S. Appl. No. 15/743,572 , "Non-Final Office Action", dated Apr. 6, 2020, 21 pages.
U.S. Appl. No. 15/745,644 , "Notice of Allowance", dated Jul. 10, 2019, 8 pages.
U.S. Appl. No. 15/745,597 , "Non-Final Office Action", dated Feb. 20, 2020, 14 pages.
CA2,992,014 , "Office Action", dated Sep. 20, 2019, 3 pages.
CA2,992,014 , "Office Action", dated Feb. 26, 2019, 4 pages.

* cited by examiner

MONITORING SYSTEM FOR PRESSURE PUMP CAVITATION

TECHNICAL FIELD

The present disclosure relates generally to pressure pumps for a wellbore and, more particularly (although not necessarily exclusively), to determining an onset of cavitation in a multi-chamber pressure pump.

BACKGROUND

Pressure pumps may be used in wellbore treatments. For example, hydraulic fracturing (also known as "fracking" or "hydro-fracking") may utilize a pressure pump to introduce or inject fluid at high pressures into a wellbore to create cracks or fractures in downhole rock formations. Due to the high-pressured and high-stressed nature of the pumping environment, pressure pump parts may undergo mechanical wear and require frequent replacement. The frequent change of parts may result in additional costs for the replacement parts and additional time due to the delays in operation while the replacement parts are installed.

DETAILED DESCRIPTION

Figure 1A:
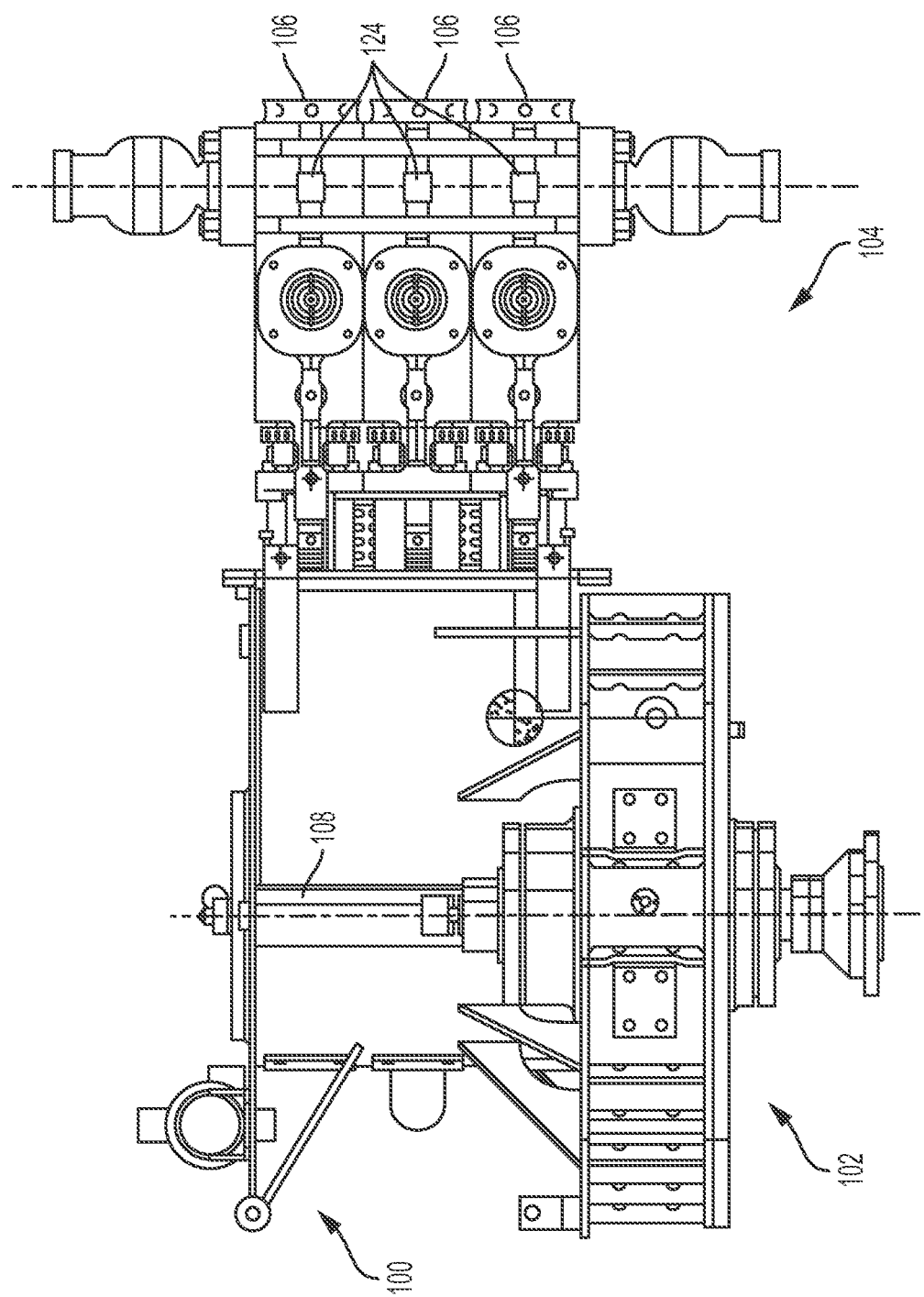
FIG. 1A is a cross-sectional, top view schematic diagram depicting an example of a pressure pump that may include a monitoring system according to one aspect of the present disclosure.

Certain aspects and examples of the present disclosure relate to a monitoring system for identifying cavitation in a pressure pump by monitoring and comparing delays in the actuation of the valves using strain measurements. The pressure pump may be in fluid communication with an environment of a wellbore. The pressure pump may include multiple chambers on a fluid end of the pressure pump for receiving and discharging fluid for injecting fluid into the wellbore. Each chamber may include a suction valve that may be actuated to open and close to allow fluid to enter the chamber in response to the movement of a plunger in the chamber. Each chamber may also include a discharge valve in the chamber that may be actuated to open and close to allow fluid to exit the chamber in response to the movement of the plunger. The plungers in each chamber of the pressure pump may be mechanically coupled to a single crankshaft causing the plungers to operate in concert in their respective chambers. As fluid is received and discharged from the chambers, pressure and strain in the fluid end fluctuates. The fluctuations in pressure in the fluid end of the pressure pump may cause cavitation wherein the pressure fluctuation creates a vacuum turning a portion of the fluid in the fluid end into a vapor. The introduction of the vapor into the chambers may cause the chambers be incompletely filled by liquid. The vapors may form small bubbles of gas. When the bubbles collapse, very strong shock waves may be transmitted through the fluid that may cause significant damage to the pressure pump 100.

A monitoring system may determine actuation delays of the valves in the chambers by correlating actuation points representing the actuation (e.g., the opening and closing) of the valves with the position of a plunger in the chambers to distinguish between an onset of cavitation in the chambers or an alternative chamber condition. The actuation points may be determined based on discontinuities in strain of the chamber measurable by the monitoring system. A monitoring system according to some aspects may determine strain in each chamber of the pressure pump. Strain gauges may be coupled to the fluid end of the pressure pump and may generate strain signals that represent the strain each of the chambers. In some aspects, the monitoring system may also determine a position of the plungers in each chamber at the time of actuation of the valves in each chamber. The plunger position may be determined by cross-referencing the actuation points of the valves with a position signal generated by a position sensor. The position sensor may be coupled to the power end of the pressure pump and the generated signals may represent the position of a crankshaft mechanically coupled to the plungers. The monitoring system may correlate the actuation points with the position of the plunger to determine actuation angles corresponding to delays in the actuation of the valves in each. In some aspects, the actuation delay of the valves may correspond to a condition of the chamber in which the valves are located. The actuation delays may be compared to determine the performance of the fluid end. Deviations in the actuation delays corresponding to compression in the fluid end may indicate potential cavitation in the fluid end of the pressure pump.

In some examples, the actuation may allow an operator or technician to distinguish between an onset of cavitation in the fluid end of the pressure pump and other conditions affecting the performance of the pressure pump. For example, a conventional flowmeter may be used to detect cavitation in the fluid end based on an unexpectedly low suction or inlet rate of fluid into the chamber, but the flowmeter may conflate indications of potential cavitation with indications of a potential leak in a chamber of the pressure pump. The monitoring system according to some aspects may discriminate between the occurrence of potential cavitation and potential leakage by determining actuation delays corresponding to the compression and decompression of the pressure pump. For example, cavitation may be distinguishable from a potential leak where deviations are present in the actuation delays corresponding to compression of the pressure pump, but actuation delays corresponding to the decompression of the pressure pump are within a critical valve limit (e.g., the normal range of operation for the valves corresponding to the actuation delays). Conversely, a leak or other condition in a chamber of the pressure pump may, over time, cause deviations in actuation delays corresponding to both the compression and decompression of the pressure pump with an actuation delay on the decompression side falling outside of the critical valve limit. In another example, the deviations of the actuation delays corresponding to compression of the pump may be present between each of a set of three or more actuation delays. Conversely, a leak or other condition in a chamber of the pressure pump may not be likely to affect the actuation delays corresponding to valves in the other chambers of the pressure pump.

Figure 1B:
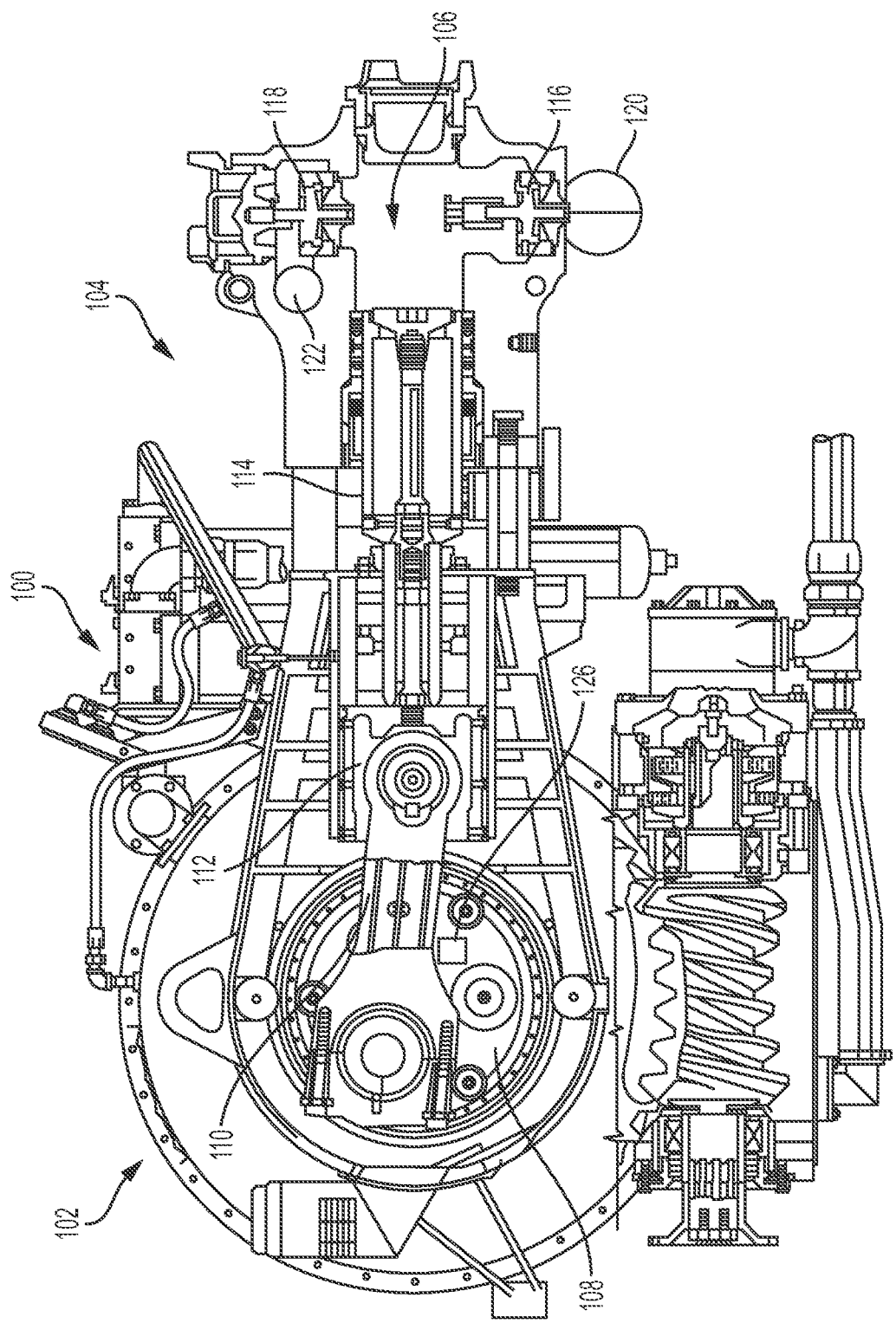
FIG. 1B is a cross-sectional, side view schematic diagram depicting the pressure pump of FIG. 1A according to one aspect of the present disclosure.

FIGS. 1A and 1B show a pressure pump 100 that may utilize a monitoring system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes three chambers 106 for receiving and discharging fluid flowing through the pressure pump 100. Although FIG. 1A shows three chambers 106 in the pressure pump 100, the pressure pump 100 may include additional chambers 106 without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc.). The crankshaft 108 may be positioned on the power end 102 of the pressure pump 100 and may be mechanically connected to a plunger 114 in a chamber 106 of the pressure pump via the connecting rod 110 and the crosshead 112. The power end 102 may include an external casing or crankcase. The crankshaft 108 may cause a plunger 114 located in each chamber 106 to displace any fluid in the chambers 106. Each chamber 106 of the pressure pump 100 may include a separate plunger 114, each plunger 114 in each chamber 106 mechanically connected to the crankshaft 108 via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the corresponding chamber 106. Based on the mechanical coupling of the crankshaft 108 to the plunger 114 in the chamber 106, the movement of the plunger 114 in each chamber 106 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in each chamber 106, the plunger 114 may impart motion and pressure to the fluid in the chamber 106 by direct displacement. The suction valve 116 and the discharge valve 118 in each chamber 106 may open or close based on the displacement of the fluid in the chamber 106 by the operation of the plunger 114. For example, the suction valve 116 may be opened during a recession of the plunger 114 to provide absorption of fluid from outside of the chamber 106 into the chamber 106. As the plunger 114 is withdrawn from the chamber 106, a partial suction may be created to open the suction valve 116 to allow fluid to enter the chamber 106. In some aspects, the fluid may be absorbed into each chamber 106 from a corresponding inlet manifold 120. Fluid already in each chamber 106 may move to fill the space where the plunger 114 was located in the chamber 106. The discharge valve 118 may be closed during this process. In some aspects, this process may correspond to a decompression of the pressure pump 100.

The discharge valve 118 may be opened as the plunger 114 moves forward (or reenters) the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. The discharge valve 118 in each chamber 106 may discharge the fluid into a corresponding discharge manifold 122. In some aspects, this process may correspond to the compression of the pressure pump 100. As the pressure is reduced inside the chamber 106, the loss of pressure may allow the discharge valve 118 to close and the cycle may restart. Together, the suction valves 116 and the discharge valves 118 in each chamber 106 may operate to provide the fluid flow of the pressure pump 100 in a desired direction. The pump process may include a measurable amount of pressure and stress in each chamber 106, the stress resulting in strain to the chamber 106 or fluid end 104 of the pressure pump 100.

In some aspects, a monitoring system according to some aspects of the present disclosure may be coupled to the pressure pump 100 to gauge the strain and determine actuation of the suction valve 116 and the discharge valve 118 in the chamber 106. For example, a monitoring system may include strain gauges positioned on an external surface of the fluid end 104 to gauge strain in the chambers 106. Block 124 in FIG. 1A show example placements for each of the strain gauges that may be included in the monitoring system. In some aspects, the monitoring system may include a separate strain gauge to monitor strain in each chamber 106 of the pressure pump 100. In some aspects, a monitoring system according to some aspects may also include one or more position sensors for sensing the position of the crankshaft 108. Measurements of the crankshaft position may allow the monitoring system to determine the position of the plungers 114 in the respective chambers 106. A position sensor of the monitoring system may be positioned on an external surface of the pressure pump 100. Block 126 shows an example placement of a position sensor on an external surface of the power end 102 to sense the position of the crankshaft 108. In some aspects, measurements from the position sensor may be correlated with the measurements from the strain gauges to determine actuation delays corresponding to the valves 116, 118 in each chamber 106 of the pressure pump 100 for identifying cavitation in the fluid end 104.

Figure 2:
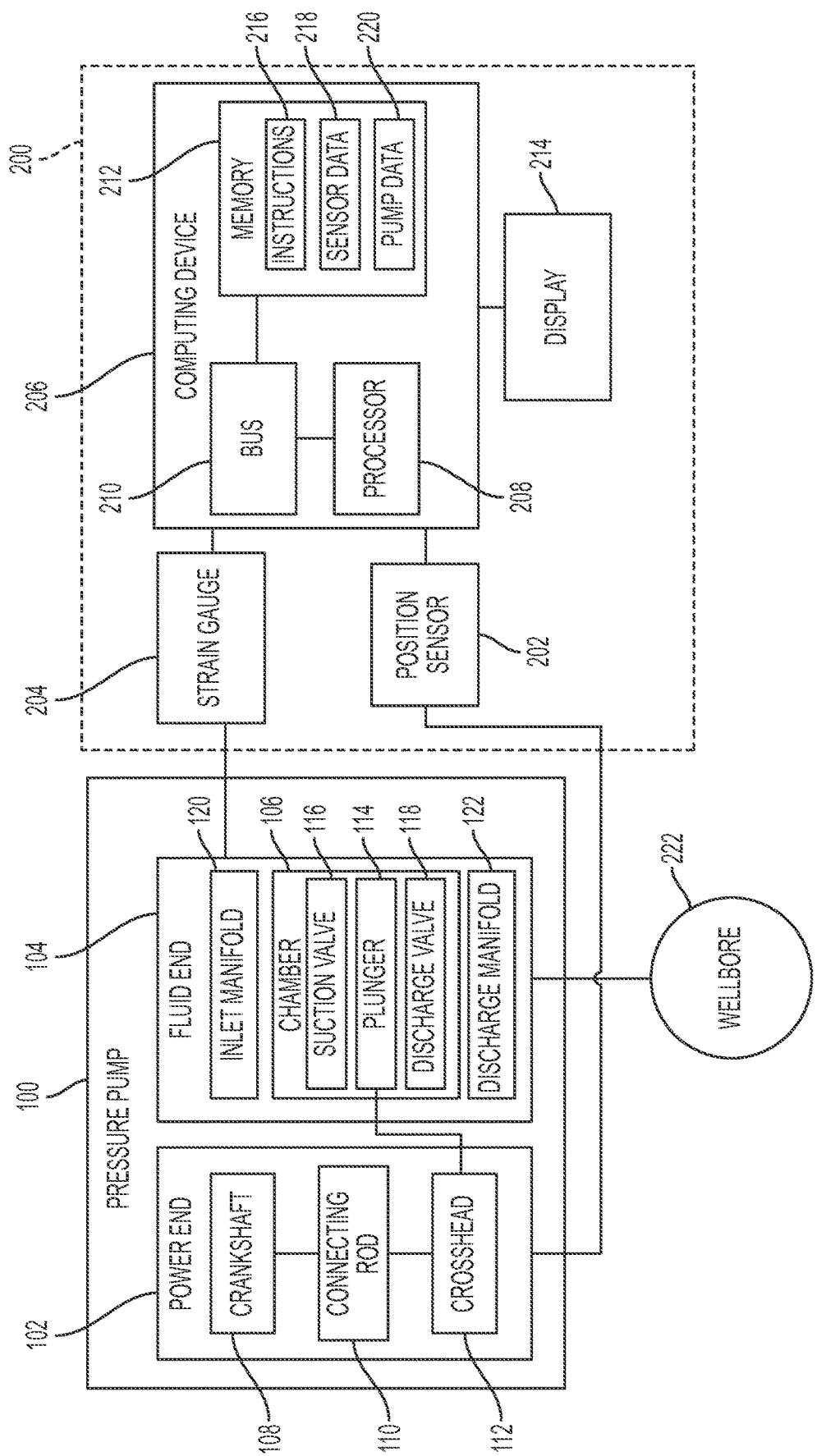
FIG. 2 is a block diagram depicting a monitoring system for a pressure pump according to one aspect of the present disclosure.

FIG. 2 is a simple block diagram showing an example of a monitoring system 200 coupled to the pressure pump 100. The monitoring system 200 includes a position sensor 202, strain gauges 204, and a computing device 206. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining position of the crankshaft 108. In some aspects, the position sensor 202 may be placed proximate to a path of the crosshead 112. The path of the crosshead 112 may be directly related to a rotation of the crankshaft 108. The position sensor 202 may sense the position of the crankshaft 108 based on the movement of the crosshead 112. In other aspects, the position sensor 202 may be placed on a crankcase of the power end 102 as illustrated by block 126 in FIG. 1A. The position sensor 202 may determine a position of the crankshaft 108 by detecting a bolt pattern of the crankshaft 108 as it rotates during operation of the pressure pump 100. In each aspect, the position sensor 202 may generate a signal representing the position of the crankshaft 108 and transmit the signal to the computing device 206.

The strain gauges 204 may be positioned on the fluid end 104 of the pressure pump 100. The strain gauge 204 in FIG. 2 may include three or more gauges for determining strain in each chamber 106 of the pressure pump 100. Non-limiting examples of types of strain gauges 204 may include electrical resistance strain gauges, semiconductor strain gauges, fiber optic strain gauges, micro-scale strain gauges, capacitive strain gauges, vibrating wire strain gauges, etc. The monitoring system 200 may include a strain gauge 204 for each chamber 106 of the pressure pump 100 to determine strain in each of the chambers 106, respectively. In some aspects, the strain gauges 204 may be positioned on an external surface of the fluid end 104 of the pressure pump 100 in a position subject to strain in response to stress in the corresponding chamber 106. For example, each of the strain gauges 204 may be positioned on a chamber 106 of the fluid end 104 in a manner such that when the chamber 106 corresponding to each strain gauge 204 loads up, strain may be present at the location of the strain gauge 204. Placement of the strain gauges 204 may be determined based on engineering estimations, finite element analysis, or by some other analysis. For example, finite element analysis may determine that strain in a chamber 106 may be directly over a plunger bore of that chamber 106 during load up. The strain gauges 204 may be placed on an external surface of the pressure pump 100 in a location directly over the plunger bore corresponding to a chamber 106 as illustrated by block 124 in FIG. 1A to measure strain in the chamber 106. The strain gauge 204 may generate a signal representing strain in the chamber 106 and transmit the signal to the computing device 206.

The computing device 206 may be coupled to the position sensor 202 and the strain gauge 204 to receive the generated signals from the position sensor 202 and the strain gauge 204. The computing device 206 may include a processor 208, a bus 210, and a memory 212. In some aspects, the monitoring system 200 may also include a display unit 214. The processor 208 may execute instructions 216 including one or more operation for determining the condition of the valves 116, 118 of the pressure pump 100. The instructions 216 may be stored in the memory 212 coupled to the processor 208 by the bus 210 to allow the processor 208 to perform the operations. The processor 208 may include one processing device or multiple processing devices. Non-limiting examples of the processor 208 may include a Field-Programmable Gate Array ("FPGA"), an application-specific integrated circuit ("ASIC"), a microprocessor, etc.

The non-volatile memory 212 may include any type of memory device that retains stored information when powered off. Non-limiting examples of the memory 212 may include electrically erasable and programmable read-only memory ("EEPROM"), a flash memory, or any other type of non-volatile memory. In some examples, at least some of the memory 212 may include a medium from which the processor 208 can read the instructions 216. A computer-readable medium may include electronic, optical, magnetic or other storage devices capable of providing the processor 208 with computer-readable instructions or other program code (e.g., instructions 216). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 216. The instructions 216 may include processor-specific instructions generated by a compiler or an interpreter from code written in any suitable computer-programming language, including, for example, C, C++, C#, etc.

In some examples, the computing device 206 may determine an input for the instructions 216 based on sensor data 218 from the position sensor 202 or the strain gauges 204, data input into the computing device 206 by an operator, or other input means. For example, the position sensor 202 or the strain gauges 204 may sense or measure a parameter associated with the pressure pump 100 (e.g., the position of the crankshaft 108, strain in the chamber 106) and transmit associated signals to the computing device 206. The computing device 206 may receive the signals, extract data from the signals, and store the sensor data 218 in memory 212. In additional aspects, the computing device 206 may determine an input for the instruction 216 based on pump data 220 stored in the memory 212 in response to previous determinations by the computing device 206. For example, the processor 208 may execute instructions 216 for determining a critical valve limit for the valves 116, 118 in the pressure pump 100 and may store the results as pump data 220 in the memory 212 for use in further pressure pump 100 and monitoring system 200 operations (e.g., calibrating the pressure pump 100, determining conditions in one or more chambers 106 of the pressure pump 100, etc., identifying cavitation in the fluid end 104 of the pressure pump 100).

In some aspects, the computing device 206 may generate interfaces associated with the sensor data 218 or pump data 220, and information generated by the processor 208 therefrom, to be displayed via a display unit 214. The display unit 214 may be coupled to the processor 208 and may include any CRT, LCD, OLED, or other device for displaying interfaces generated by the processor 208. In some aspects, the computing device 206 may also generate an alert or other communication of the performance of the pressure pump 100 based on determinations by the computing device 106 in addition to the graphical interfaces. For example, the display unit 214 may include audio components to emit an audible signal when an ill condition (e.g., cavitation) is present in the pressure pump 100.

In some aspects, in addition to the monitoring system 200, the pressure pump 100 may also be coupled to a wellbore 222. For example, the pressure pump 100 may be used in hydraulic fracturing to inject fluid into the wellbore 222. Subsequent to the fluid passing through the chambers 106 of the pressure pump 100, the fluid may be injected into the wellbore 222 at a high pressure to break apart or otherwise fracture rocks and other formations adjacent to the wellbore 222 to release or otherwise stimulate hydrocarbons. The monitoring system 200 may monitor the fluid end 104 of the pressure pump 100 to determine when to halt the fracturing process for maintenance of the pressure pump 100. Although hydraulic fracturing is described here, the pressure pump 100 may be used for any process or environment requiring a positive displacement pressure pump.

Figure 3:
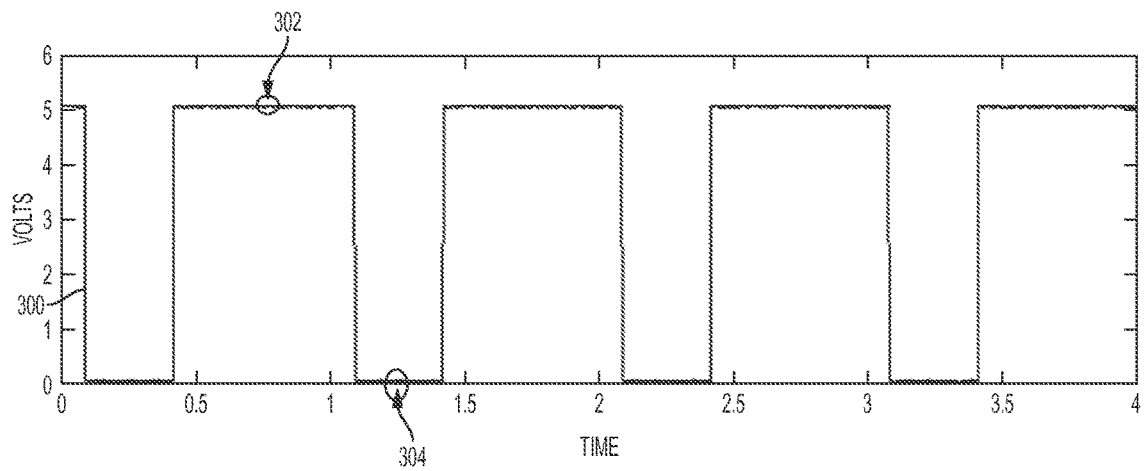
FIG. 3 is a signal graph depicting a signal generated by a position sensor of the monitoring system of FIG. 2 according to one aspect of the present disclosure.
Figure 4:
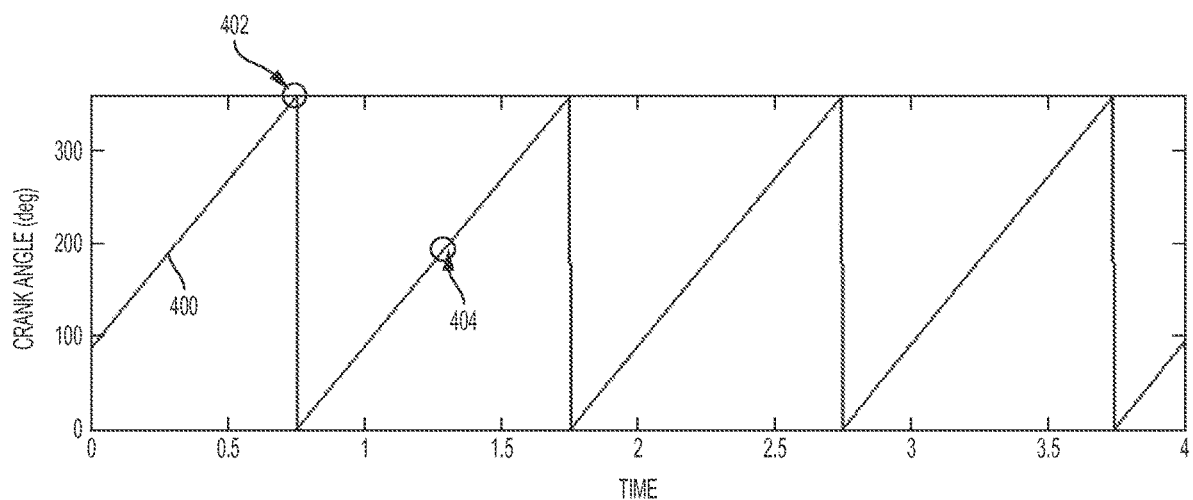
FIG. 4 is a signal graph depicting an alternative signal generated by a position sensor of the monitoring system of FIG. 2 according to one aspect of the present disclosure.

FIGS. 3 and 4 show position signals 300, 400 generated by the position sensor 202 during operation of the crankshaft 108. In some aspects, the position signals 300, 400 may be shown on the display unit 214 in response to generation of graphical representation of the position signals 300, 400 by the computing device 206. FIG. 3 shows a position signal 300 displayed in volts over time (in seconds). The position signal 300 may be generated by the position sensor 202 coupled to the power end 102 of the pressure pump 100 and positioned in a path of the crosshead 112. The position signal 300 may represent the position of the crankshaft 108 over the indicated time as the crankshaft 108 operates to cause the plungers 114 to move in their respective chambers 106. The mechanical coupling of the plungers 114 to the crankshaft 108 may allow the computing device 206 to determine a position of the plungers 114 relative to the position of the crankshaft 108 based on the position signal 300. In some aspects, the computing device 206 may determine plunger position reference points 302, 304, 402, 404 based on the position signal 300 generated by the position sensor 202. For example, the processor 208 may determine dead center positions of the plungers 114 based on the position signal 300. The dead center positions may include the position of each plunger 114 in which it is farthest from the crankshaft 108, known as the top dead center. The dead center positions may also include the position of each plunger 114 in which it is nearest to the crankshaft 108, known as the bottom dead center. The distance between the top dead center and the bottom dead center may represent the length of a full stroke of the plungers 114 operating in each chamber 106.

In FIG. 3, the top dead center is represented by reference point 302 and the bottom dead center is represented by reference point 304. In some aspects, the processor 208 may determine the reference points 302, 304 by correlating the position signal 300 with a known ratio or other value representing the relationship between the movement of the crankshaft 108 and the movement of the plungers 114 (e.g., the mechanical correlations of the crankshaft 108 to the plungers 114 based on the mechanical coupling of the crankshaft 108 to the plungers 114). The computing device 206 may determine the top dead center and bottom dead center based on the position signal 300 or may determine other plunger position reference points to determine the position of the plungers in each chamber 106 over the operation time of the pressure pump 100.

FIG. 4 shows a position signal 400 displayed in degrees over time (in seconds). The degree value may represent the angle of the crankshaft 108 during operation of the crankshaft 108 or pressure pump 100. In some aspects, the position signal 400 may be generated by the position sensor 202 located on a crankcase of the crankshaft 108. The position sensor 202 may generate the position signal 400 based on a bolt pattern of the position sensor 202 as it rotates in response to the rotation of the crankshaft 108 during operation. Similar to the position signal 300 shown in FIG. 3, the computing device 206 may determine plunger position reference points 302, 304, 402, 404 based on the position signal 400. The reference points 402, 404 in FIG. 4 represent the top dead center and bottom dead center of the plungers 114 during operation of the pressure pump 100.

Figure 5:
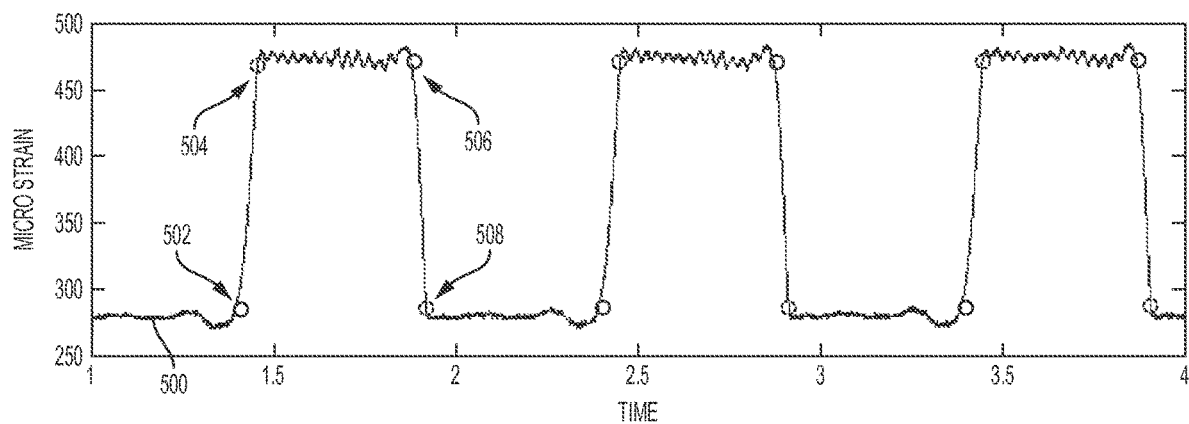
FIG. 5 is a signal graph depicting a signal generated by a strain gauge of the monitoring system of FIG. 2 according to one aspect of the present disclosure.

FIG. 5 shows a raw strain signal 500 generated by the strain gauge 204 coupled to the fluid end 104 of the pressure pump 100 and positioned on an external surface of the fluid end 104. The strain signal 500 may represent strain measured by the strain gauge 204 in a chamber 106 of the pressure pump 100. A monitoring system 200 may include a strain gauge 204 for each chamber 106 of the pressure pump 100. Each strain gauge 204 may generate a strain signal 500 corresponding to the chamber 106 for which it is measuring strain. The computing device 206 may determine the actuation points 502, 504, 506, 508 of the suction valve 116 and the discharge valve 118 for each chamber 106 based on the strain signal 500 for each chamber 106. The actuation points 502, 504, 506, 508 may represent the point in time where the suction valves 116 and the discharge valves 118 in each of the chambers 106 open and close.

The computing device 206 may execute the instructions 216 stored in the memory 212 and including signal-processing algorithms to determine the actuation points 502, 504, 506, 508. For example, the computing device 206 may execute instruction 216 to determine the actuation points 502, 504, 506, 508 by determining discontinuities in the strain signal 500 of each chamber 106. The stress in the chambers 106 may change during the operation of the suction valves 116 and the discharge valves 118 to cause the discontinuities in the strain signal 500 for each chamber 106 during actuation of the valves 116, 118 in each chamber 106. The computing device 206 may identify the discontinuities as the opening and closing of the valves 116, 118 in each chamber 106. In one example, the strain in a chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signal 500 shows a sudden increase or decrease in value corresponding to the actuation of the valves 116, 118.

In FIG. 5, actuation point 502 represents a suction valve 116 closing, actuation point 504 represents a discharge valve 118 opening, actuation point 506 represents a discharge valve 118 closing, and actuation point 508 represents a suction valve 116 opening to resume the cycle of fluid into and out of the chamber 106 in which the valves 116, 118 are located. In some aspects, the computing device 206 may cause the display unit 214 to display the strain signal 500 and the actuation points 502, 504, 506, 508 as shown in FIG. 5 for each chamber 106 of the pressure pump 100. The exact magnitudes of strain in each chamber 106 determined by the corresponding strain gauge 204 may not be required for determining the actuation points 502, 504, 506, 508 for the valves 116, 118 in each chamber 106. The computing device 206 may determine the actuation points 502, 504, 506, 508 based on the strain signal 500 corresponding to each chamber 106 providing a characterization of the loading and unloading of the strain in respective chamber 106. In some aspects, the actuation points 502, 504, 506, 508 may be cross-referenced with the position signals 300, 400 to determine an actual position of the plunger 114 at the time of valve actuation.

Figure 6:
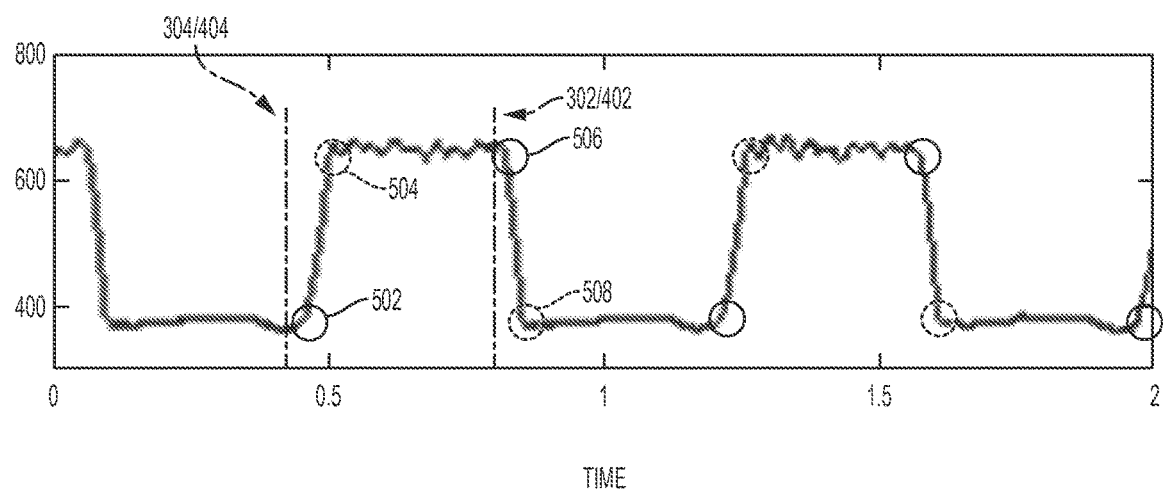
FIG. 6 is a signal graph depicting actuation of a suction valve and a discharge valve relative to the strain signal of FIG. 5 and a plunger position according to one aspect of the present disclosure.
Figure 7:
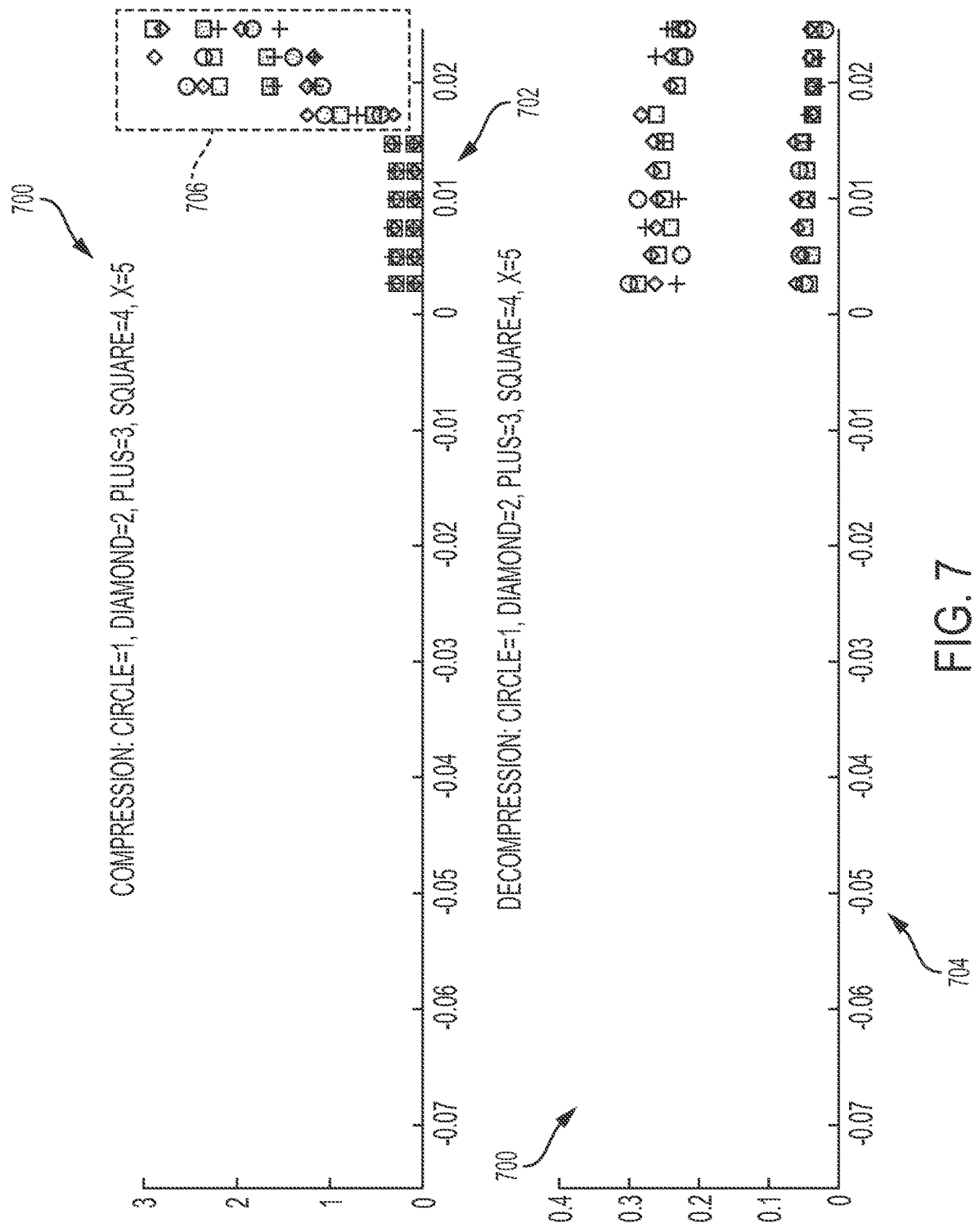
FIG. 7 is a dual plot graph depicting actuation delays of suction valves and discharge valves in chambers of a pressure pump according to one aspect of the present disclosure.
Figure 8:
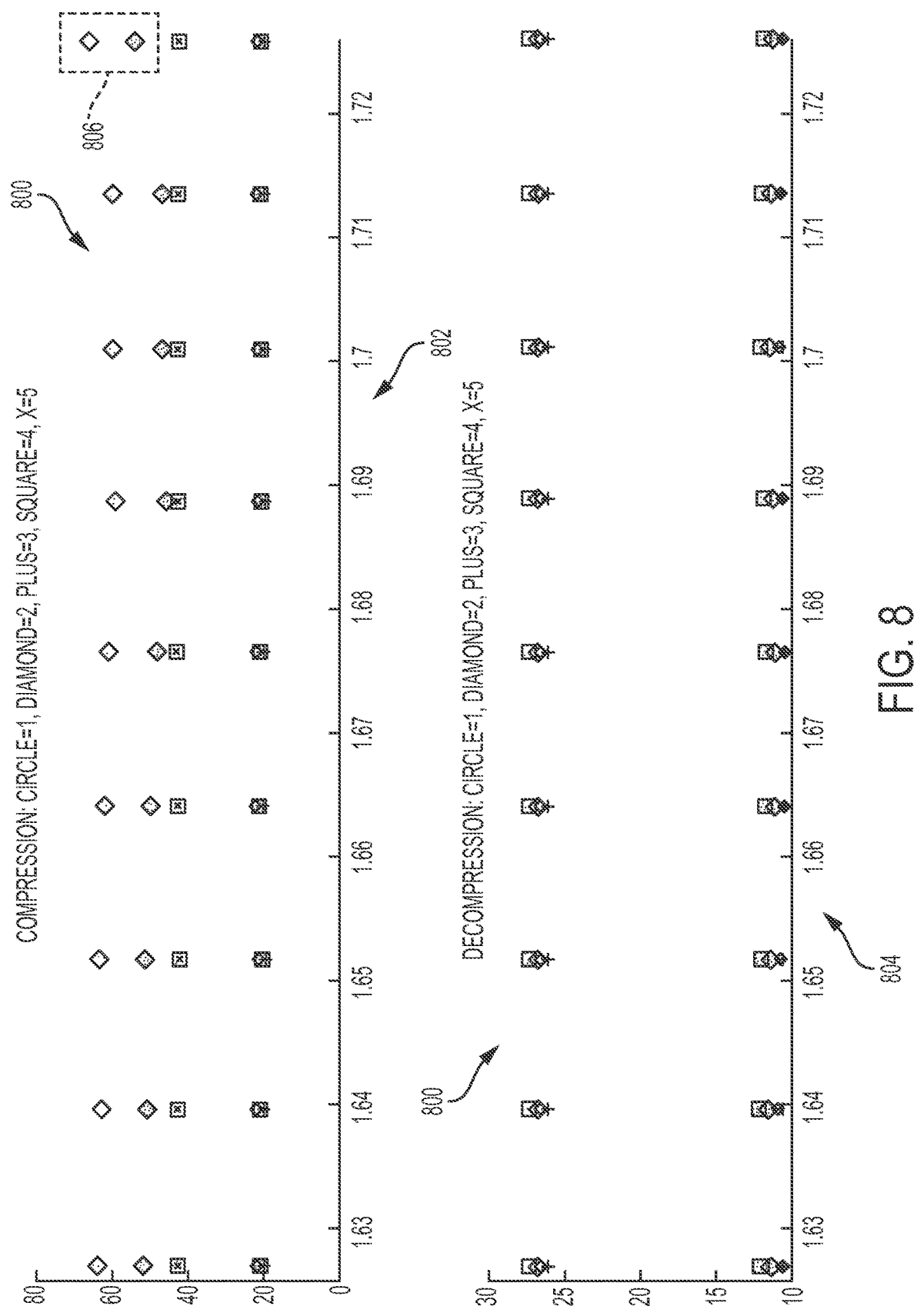
FIG. 8 is a dual plot graph depicting alternative actuation delays of suction valves and discharge valves in chambers of a pressure pump according to one aspect of the present disclosure.

FIGS. 6-8 show the actuation of the suction valves 116 and the discharge valves 118 relative to the plunger position reference points 302, 304, 402, 404. In some aspects, the graphs depicted in FIGS. 6-8 may be displayed on the display unit 214. In FIG. 6, the time distance (or amount of time) between the actuation points 502, 504, 506, 508 and the plunger position reference points 302, 304, 402, 404 may represent delays in the actuation (e.g., opening and closing) of the suction valve 116 and the discharge valve 118 for one chamber 106 of the pressure pump 100. FIG. 6 shows the strain signal 500 representing strain measured by the strain gauge 204 for the chamber 106. The actuation points 502, 504, 506, 508 of the suction valve 116 and the discharge valve 118 in the chamber 106 are plotted at the discontinuities in the strain signal 500 as described with respect to FIG.

5. Additionally, the reference points 302, 304, 402, 404 representing the top dead center and bottom dead center of the plunger 114 are plotted. The amount of time between the closing of the suction valve 116 (represented by actuation point 502) and the bottom dead center (represented by reference points 304, 404) may represent a delay in the closing of the suction valve 116. The time between the opening of the discharge valve 118 (represented by actuation point 504) and the bottom dead center (represented by reference points 304, 404) may represent a delay in the opening of the discharge valve 118. Similarly, the time between the closing of the discharge valve 118 (represented by actuation point 504) and the top dead center (represented by reference points 302, 402) may represent a delay in the closing of the discharge valve 118. And, the time between the opening of the suction valve 116 (represented by actuation point 508) and the top dead center (represented by reference points 302, 402) may represent a delay in the opening of the suction valve 116.

In FIG. 7, the actuations of the suction valves 116 and the discharge valves 118 are shown relative to the position of the plunger 114 for each chamber 106 of the pressure pump. The dual graph includes a compression side, corresponding to compression of the pressure pump 100, wherein the actuations of the valves 116, 118 are shown relative to the bottom dead center (represented by reference points 304, 404) of the plungers 114. The dual graph also includes a decompression side, corresponding to decompression of the pressure pump 100, wherein the actuations of the valves 116, 118 are shown relative to the top dead center (represented by reference points 302, 402) of the plunger 114. Actuation delays 700 are represented by the symbols on the y-axis for the distance of the actuation of each valve 116, 118 from the top dead center or the bottom dead center of the plunger 114 in each chamber. Although FIG. 7 shows the actuation delays 700 in linear distance corresponding to the movement of the plunger 114 in each chamber, the values may similarly be shown in units of degrees of rotation of the crankshaft 108 mechanically coupled to the plungers 114.

The actuation delays 700 include compression actuation delays 702 and decompression actuation delays 704. The compression actuation delays 702 include the actuation delays 700 on the compression side of the graph. The compression actuation delays 702 may represent the closing of the suction valves 116 in each of the chambers 106 of the pressure pump 100 (represented by the lighter symbols) and the opening of the discharge valves (represented by the darker symbols trending slightly lower than the symbols representing the closing of the suction valves 116) in each of the chambers 106. Different symbols may represent each chamber 106 (e.g., valves 116, 118 in a first chamber 106 may be represented by a circle, valves 116, 118 in a second chamber 106 may be represented by a diamond, etc.). Although five chambers 106 are represented, the monitoring system 200 may monitor and determine actuation delays for valves 116, 118 in any number of chambers 106.

The actuation delays 700 shown in FIG. 7 may indicate potential cavitation in the fluid end 104 of the pressure pump 100. The compression actuation delays 702 shown in block 706 include deviations between the compression actuation delays 702 representing valves 116, 118 in each of the chambers 106. The deviations may indicate that the suction valves 116 are closing at different times in each of the five chambers 106 represented by the compression actuation delays 702. The deviations may similarly indicate that the discharge valves 118 are opening at different times in each of the five chambers 106. Since deviations exist between at least three of the actuation delays 702 corresponding to three different chambers 106, potential cavitation may be indicated in the fluid end 104. Comparatively, certain other conditions in the fluid end 104 of the pressure pump (e.g., valve leaks) may be represented by only a deviation of compression actuation delays 702 for a single chamber 106 from the remaining compression actuation delays 702.

In some aspects, the processor 208 may also compare the compression actuation delays 702 with the decompression actuation delays 704 to determine or confirm cavitation. In some aspects, cavitation may be determined where deviations are present in the compression actuation delays 702, but the decompression actuation delays 704 are within the critical valve limits as shown in FIG. 7. The processor 208 may determine that the decompression actuation delays are operating within the critical valve limits by comparing the decompression actuation delays 704 with predetermined critical valve limits or by determining critical valve limits for comparison. To determine critical valve limits, the processor 208 may execute instruction 216 to compare the actuation delays 700 for similarly operating valves during similar actuations. For example, the processor 208 may determine critical valve limits for discharge valve 118 closings by comparing the decompression actuation delays 704 representing the discharge valves 118 in each chamber 106 (e.g., represented by the darker, lower-trending decompression actuation delays 704). The processor 208 may similarly determine critical valve limits for suction valve 116 openings by comparing the decompression actuation delays 704 representing the suction valves 116 in each chamber (e.g., represented by the lighter, higher-trending decompression actuation delays 704). In some aspects, the critical valve limits for a valve actuation may include the range of the majority of the actuation delays 700 corresponding to the valve actuation to define an expected operation of the valves.

In some aspects, the processor 208 may also compare the compression actuation delays 702 to critical valve limits for each of the valves 116, 118 represented by the compression actuation delays 702 to confirm cavitation. The comparison may aid in determining whether the deviations are statistically significant to indicate potential cavitation in the fluid end 104 of the pressure pump. For example, the critical valve limit may include a range large enough to indicate that all or a majority of the valves 116, 118 are operating normally despite slight deviations between the compression actuation delays 702 shown in block 706. The compression actuation delays 702 may be indicative of potential cavitation where compression actuation delays 702 corresponding to multiple chambers 106 fall outside of the critical valve limits as shown in FIG. 7. Other conditions (e.g., leaks) may be indicated where the compression actuation delays 702 corresponding to a majority of the chambers 106 are within the critical valve limit of the corresponding valves 116, 118 (e.g., only compression actuation delays 702 corresponding to one chamber 106 fall outside of the critical valve limit).

FIG. 8 shows another example of actuation delays 800 determined by the processor 208. The actuation delays 800 include compression actuation delays 802 on the compression side of the graph and decompression actuation delays 704 on the decompression side of the graph. On the compression side, the processor 208 may determine that a majority or nearly all of the compression actuation delays 802 are within a critical range. For example, there may be no significant deviation between the compression actuation delays 802 with the exception of the compression actuation delays 802 corresponding to the second tank (e.g., represented by diamond symbols). On the decompression side of the graph, the decompression actuation delays 704 appear to be operating within the critical valve limit and appear to have no significant deviations in between any of the decompression actuation delays 704. The processor 208 may not determine cavitation based on the actuation delays 800 as the compression actuation delays 804 show no deviation of compression actuation delays 804 between at least three of the actuation delays 802 corresponding to three different chambers 106. Block 806 includes the compression actuation delays 802 deviating from the remaining compression actuation delays 802. The compression actuation delays 802 in block 806 represent valves in only one chamber 106 of the pressure pump (e.g., a second chamber 106 represented by diamond symbols). In some aspects, the processor 208 may instead determine another condition (e.g., a delayed sealing leak) in the second chamber 106 since there is only a deviation between one of the actuation delays 702 corresponding to one of the chambers 106.

Figure 9:
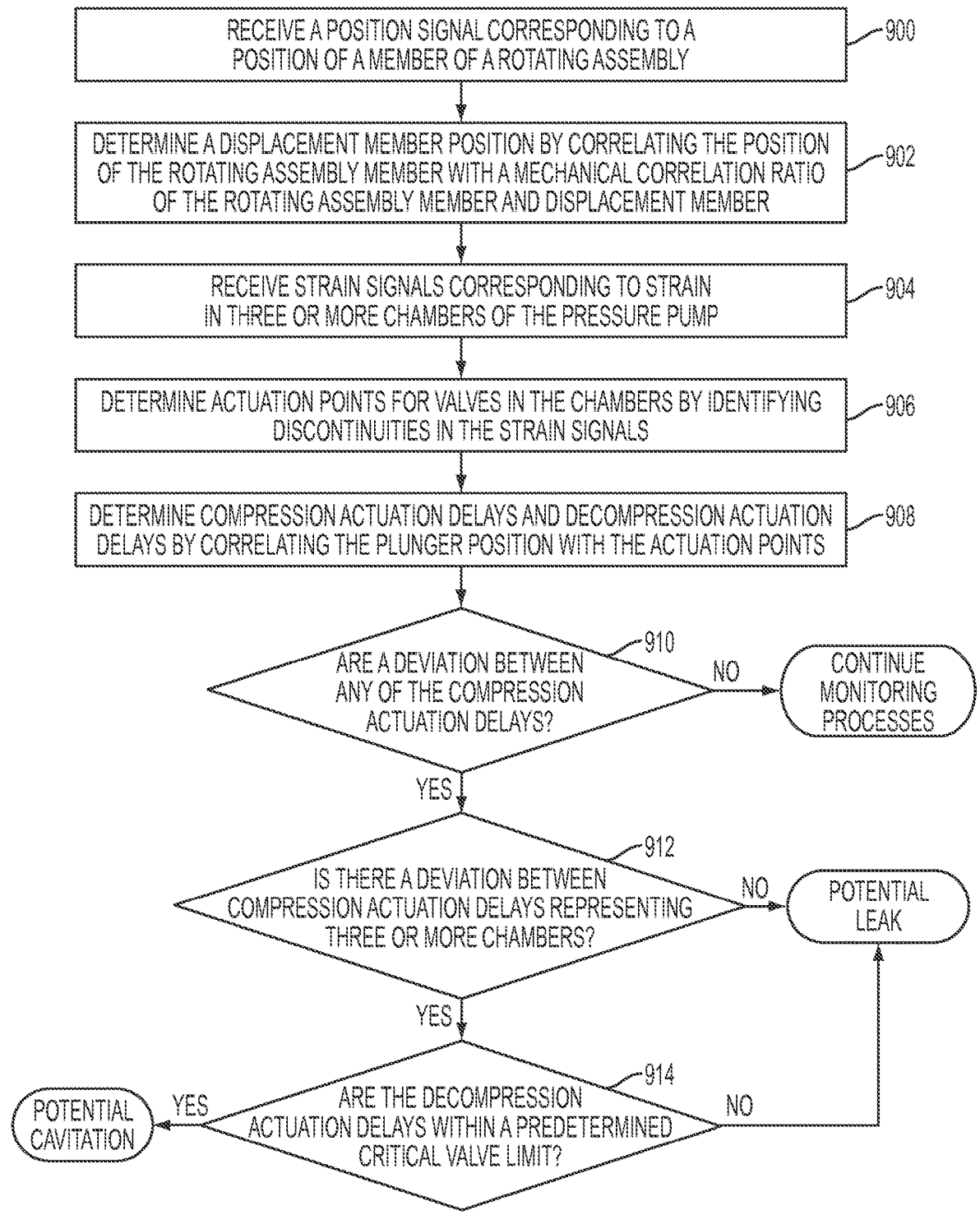
FIG. 9 is a flowchart describing a process for identifying cavitation in a pressure pump according to one aspect of the present disclosure.

FIG. 9 is a flowchart showing a process for identifying cavitation in the pressure pump 100 by monitoring the valves 116, 118 in the pressure pump 100. The process is described with respect to the monitoring system 200 shown in FIG. 2, although other implementations are possible without departing from the scope of the present disclosure.

In block 900, the processor 208 may receive a strain signal 500 from the strain gauges 204 for each of the chambers 106. In some aspects, the monitoring system 200 may include at least three strain gauges 204. The strain gauges 204 may be positioned on the fluid end 104 of the pressure pump 100 and generate a strain signal 500 corresponding to strain in each chamber 106 of the pressure pump 100. The strain signal 500 may represent a characterization of the strain in a chamber 106 as the suction valve 116 and the discharge valve 118 for each chamber 106 actuate (e.g., open or close) in response to the operation of the plunger 114 in the chambers 106.

In block 902, the processor 208 may determine the actuation points 502, 504, 506, 508 for the suction valve 116 and the discharge valve 118 in each chamber 106 of the pressure pump 100. In some aspects, the processor 208 may determine actuation points 502, 504, 506, 508 based on the discontinuities in the strain signal 500 for each chamber 106 as described with respect to FIG. 5. The actuation points 502, 508 may represent the closing and opening of the suction valves 116, respectively. The actuation points, 504, 506 may represent the opening and closing of the discharge valves 118, respectively.

In block 904, the processor 208 may determine actuation delays 700, 800 for the suction valve 116 or the discharge valve 118 in each chamber 106. In some aspects, the determination may be made based on the position of the respective plunger 114 (or other displacement member in the chamber 106) and the respective actuation points 502, 504, 506, 508 of the valves 116, 118 for each chamber 106. The processor 208 may determine the position of the plungers 114 or other displacement members for each chamber 106 based on the position signal 300, 400 received from the position sensor 202 For example, the plungers 114 may be mechanically coupled to the crankshaft 108 in a manner that the movement or position of the plungers 114 in each chamber 106 is directly related to the movement or position of the crankshaft 108 and in a manner that the plungers 114 operate in concert in their respective chambers 106. In some aspects, the position signal 300, 400 may be received simultaneously with the strain signal 500. Based on the mechanical coupling of the crankshaft 108 and the plungers 114, the processor 208 may determine plunger position reference points 302, 304, 402, 404 corresponding to the position of the plungers 114 at various times during operation of the crankshaft 108 or pressure pump 100. For example, the processor 208 may determine reference points 302, 304 representing the top dead center and bottom dead center positions of the plungers 114, respectively.

The processor 208 may correlate the reference points 302/402, 304/404 corresponding to the position of the plunger 114 and derived from the position signal 300/400 with the actuation points 502, 504, 506, 508 corresponding to the actuation of the suction valve 116 and discharge valve 118 for each chamber 106 to determine the actuation delays 700, 800. The actuation delays may include compression actuation delays 702, 802 corresponding to the closing of the suction valves 116 in each chamber 106 and the opening of the discharge valves 118 in each chamber 106. The actuation delays may also include decompression actuation delays 704, 804 corresponding to the opening of the suction valves 116 in each chamber 106 and the closing of the discharge valves 118 in each chamber 106. The amount of time or distance between the reference point 302/304 or the reference point 304/404 of the position of the plunger 114 and the actuation points 502, 504, 506, 508 may represent the actuation delays 700, 800 corresponding to the opening and closing of the suction valve 116 and the discharge valve 118.

In block 906, the processor 208 may determine whether a deviation exists between the compression actuation delays 702, 802. In some aspects, the processor 208 may compare each of the compression actuation delays 702, 802 with the remaining compression actuation delays 702, 802 representing the same type of valve (e.g., comparing each of the compression actuation delays 702 representing the suction valves 116, comparing each of the compression actuation delays 702 representing the discharge valves 118). In additional and alternative aspects, the processor 208 may determine whether the compression actuation delays 702, 802 are within the critical valve limit. The processor 208 may determine that no deviations exist where each of the compression actuation delays 702, 802 is with the critical valve limits. The processor 208 may continue to monitor the valves 116, 118 via the actuation delays 700, 800 for deviations that may be indicative of issues within one or more of the chambers 106 represented by the actuation delays 700, 800.

In block 908, the processor 208 may determine whether deviations exist between compression actuation delays 702, 802 representing three or more different chambers 106 of the pressure pump 100. In some aspects, the processor 208 may compare each compression actuation delay 702, 802 to the remaining compression actuation delays 702, 802 to determine whether a deviation exists. In additional and alternative aspects, the processor 208 may compare the compression actuation delays 702, 802 to the critical valve limits to determine whether multiple compression actuation delays 702, 802 fall outside of the critical valve limits indicating. The processor 208 may determine that a potential leak or other condition exists where a deviation between the compression actuation delays 702, 802 exists with respect to only one corresponding chamber 106 as described with respect to FIG. 8. In some aspects, the processor 208 may determine that potential cavitation exists in the fluid end of the pressure pump 100 based on identifying deviations between compression actuation delays 702, 802 representing three or more chambers 106 of the pressure pump 100. In other aspects, the processor 208 may proceed to block 914 to confirm a determination of cavitation.

In block 910, the processor 208 may determine or confirm cavitation in the fluid end 104 by determining whether the decompression actuation delays 704, 804 are within a predetermined critical limit. In some aspects, the processor 208 may compare each of the decompression actuation delays 704, 804 to determine whether a deviation exists between them. In other aspects, the processor 208 may compare each of the decompression actuation delays 704, 804 with the critical valve limits to determine whether they are within the range. In some aspects, the processor 208 may determine or confirm a potential leak identified in response to performing the steps described in block 912 where decompression actuation delays 704, 804 representing one of the chambers 106 fall outside of the critical valve limits. For example, a deviation by the decompression actuation delays 704, 804 representing one of the chambers 106 following an identification of a deviation by the compression actuation delays 702, 802 representing the chamber 106 may indicate a significant leak or other condition in the corresponding chamber 106. The processor 208 may determine or confirm cavitation indicated or identified in response to performing the steps described in block 912 where all of the decompression actuation delays 704, 804 are within the critical valve limits. For example, deviations between the compression actuation delays 702, 802 representing three or more chambers 106 while the decompression actuation delays 704, 804 are within the critical valve limit may indicate cavitation in the fluid end 104 of the pressure pump 100.

In some aspects, pumping systems are provided according to one or more of the following examples:

Example #1

A monitoring system for use in a pump having multiple chambers may comprise three or more strain gauges positionable proximate to three or more chambers in a fluid end of the pump to measure strain in the three or more chambers and generate corresponding strain signals representing the strain in each of the three or more chambers. The corresponding strain signals may be usable in determining actuation points for corresponding valves in each of the three or more chambers. The monitoring system may also comprise a computing device couplable to the three or more strain gauges. The computing device may include a processing device for which instructions executable by the processing device are used to cause the processing device to determine actuation delays of each of the corresponding valves using the actuation points for the corresponding valves. The actuation delays may be usable in identifying cavitation in the three or more chambers of the pump.

Example #2

The monitoring system of Example #1 may feature the computing device comprising a memory device including instructions executable by the processing device for causing the processing device to determine the cavitation by comparing the actuation delays for each of the corresponding valves and identifying compression delay deviations between the actuation delays corresponding at least three of the three or more chambers.

Example #3

The monitoring system of Examples #1-2 may feature the actuation delays including at least a first compression actuation delay, a second compression actuation delay, and a third compression actuation delay. The compression delay deviations may include a first deviation between the first compression actuation delay and the second compression actuation delay, a second deviation between the second compression actuation delay and the third compression actuation delay, and a third deviation between the first compression actuation delay and the second compression actuation delay.

Example #4

The monitoring system of Examples #1-2 may feature the actuation delays including compression actuation delays and decompression actuation delays. The compression delay deviations may represent deviations between at least three of the compression actuation delays. The decompression actuation delays may be within a predetermined critical valve limit.

Example #5

The monitoring system of Examples #1-2 may feature the actuation delays including suction opening delays and discharge closure delays. The compression delay deviations may include a first set of deviations between at least three of the suction opening delays and a second set of deviations between at least three of the discharge closure delays.

Example #6

The monitoring system of Examples #1-5 may feature the three or more strain gauges being positionable on an external surface of the fluid end of the pump. The three or more strain gauges may include at least a first strain gauge positionable on the fluid end to measure the strain in a first chamber of the three or more chambers, a second strain gauge positionable on the fluid end to measure the strain in a second chamber of the three or more chambers, and a third strain gauge positionable on the fluid end to measure the strain in a third chamber of the three or more chambers.

Example #7

The monitoring system of Examples #1-6 may also include a position sensor positionable on a power end of the pump to sense a position of a member of a rotating assembly and generate a position signal representing the position of the member during operation of the pump. The position signal may be usable in determining a position of a displacement member in each of the three or more chambers. The computing device may also comprise a memory including instructions executable by the processing device for causing the processing device to determine the actuation delays by correlating the position of the displacement member in each of the three or more chambers with the actuation points for the corresponding valves.

Example #8

The monitoring system of Example #7 may feature the position sensor being positionable proximate to a path of the rotating assembly to determine the position of the member.

Example #9

The monitoring system of Examples #7 may feature the position sensor being positionable on a crankcase to determine a bolt pattern representing the position of the member.

Example #10

A pumping system may comprise a pump including a fluid end and a power end. The fluid end of the pump may include three or more chambers. Each of the three or more chambers may include corresponding valves actuatable at corresponding actuation points that are measurable by corresponding strain gauges for each of the three or more chambers. Each of the three or more chambers further may include corresponding plungers. Each of the corresponding plungers may be mechanically coupled to a crankshaft in the power end of the pump and actuatable between a first reference point and a second reference point through a plunger transition between the first reference point and the second reference point. The pumping system may also comprise a computing device couplable to the pump. The computing device may include a processing device for which instructions executable by the processing device are used to cause the processing device to determine actuation delays of each of the corresponding valves by correlating the position of the corresponding plungers with the corresponding actuation points. The actuation delays may represent the corresponding actuation points relative to the position of the corresponding plungers during operation of the pump and being useable in identifying cavitation in the fluid end of the pump.

Example #11

The pumping system of Example #10 may feature the computing device comprises a memory device including instructions executable by the processing device for causing the processing device to determine the cavitation by comparing the actuation delays for each of the corresponding valves and identifying compression delay deviations between the actuation delays corresponding to at least three of the three or more chambers.

Example #12

The pumping system of Examples #10-11 may feature the actuation delays including at least three compression actuation delays. The compression delay deviations may include deviations between each of the at least three compression actuation delays.

Example #13

The pumping system of Examples #10-12 may feature the actuation delays including suction opening delays and discharge closure delays. The compression delay deviations may include a first set of deviations between at least three of the suction opening delays and a second set of deviations between at least three of the discharge closure delays.

Example #14

The pumping system of Examples #10-13 may feature the corresponding strain gauges being positionable on an external surface of the fluid end of the pump to measure strain in the three or more chambers. The corresponding strain gauges may include at least a first strain gauge positionable on the fluid end to measure the strain in a first chamber of the three or more chambers and generate a first strain signal representing the strain in the first chamber, a second strain gauge positionable on the fluid end to measure the strain in a second chamber of the three or more chambers and generate a second strain signal representing the strain in the second chamber, and a third strain gauge positionable on the fluid end to measure the strain in a third chamber of the three or more chambers and generate a third strain signal representing the strain in the third chamber. The computing device may comprise a memory device including instructions executable by the processing device for causing the processing device to determine the corresponding actuation points for each of the corresponding valves by identifying discontinuities in the first strain signal, the second strain signal, and the third strain signal.

Example #15

The pumping system of Examples #10-14 may feature the first reference point and the second reference point being measurable by a position sensor couplable to the pump and the computing device. The position sensor may be positionable on an external surface of the power end of the pump to sense a position of the crankshaft and generate a position signal corresponding to the position of the crankshaft.

Example #16

The pumping system of Example #15 may feature the first reference point corresponding to a first plunger position and the second reference point corresponding to a second plunger position. A distance between the first plunger position and the second plunger position may represent a full stroke length of the corresponding plungers for each of the three or more chambers. The computing device may comprise a memory device including instructions executable by the processing device for causing the processing device to determine the first reference point and the second reference point of the corresponding plungers by correlating the position signal with a ratio representing a mechanical correlation of the corresponding plungers to the crankshaft.

Example #17

The pumping system of Examples #10-16 may also comprise a display unit couplable to the computing device. The computing device may comprise a memory device including instructions executable by the processing device for causing the processing device to generate a graphical representation of the actuation delays for each of the corresponding valves.

Example #18

A method for identifying cavitation in a pump may comprise receiving, from each of three or more strain gauge coupled to an external surface of a fluid end of the pump, strain signals representing strain in each of three or more chambers of the pump. The method may also comprise determining, by the computing device, actuation points corresponding to an opening or a closing of valves in each of the three or more chambers by identifying discontinuities in the strain signals. The method may also comprise determining, by the computing device, compression actuation delays and decompression actuation delays for each of the valves using the actuation points. The method may also comprise comparing, by the computing device, the compression actuation delays corresponding to each of the three or more chambers to identify deviations between any of the compression actuation delays.

Example #19

The method of claim 18 may feature comparing the compression actuation delays to include identifying the deviations between each of at least three of the three or more compression actuation delays.

Example #20

The method of Examples #18-19 may further include receiving, from a position sensor coupled to a power end of the pump, a position signal representing a position of a member of a rotating assembly of the pump. The method may also comprise determining, by a computing device, a position of corresponding displacement members operable in each of the three or more chambers by correlating the position of the member of the rotating assembly with a ratio representing a mechanical correlation of the member of the rotating assembly to the corresponding displacement members. The method may also feature determining the compression actuation delays and the decompression actuation delays to include correlating the position of the corresponding displacement members in each of the three or more chambers with the actuation points.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A monitoring system for use in a pump having multiple chambers, comprising:
    three or more strain gauges positionable proximate to three or more chambers in a fluid end of the pump to measure strain in the three or more chambers and generate corresponding strain signals representing the strain in each of the three or more chambers; and
    a computing device couplable to the three or more strain gauges, the computing device including a processing device and a memory device, the memory device including instructions that are executable by the processing device for causing the processing device to:
        receive the strain signals from each of three or more strain gauges;
        determine actuation points corresponding to an opening or a closing of valves in each of the three or more chambers by identifying discontinuities in the strain signals;
        determine actuation delays for the valves using the actuation points, wherein the actuation delays include at least a first compression actuation delay, a second compression actuation delay, and a third compression actuation delay; and
        compare the actuation delays corresponding to each of the three or more chambers to identify compression delay deviations between any of the actuation delays, wherein the compression delay deviations include a first deviation between the first compression actuation delay and the second compression actuation delay, a second deviation between the second compression actuation delay and the third compression actuation delay, and a third deviation between the first compression actuation delay and the third compression actuation delay.

2. The monitoring system of claim 1, wherein the actuation delays also include decompression actuation delays, and wherein the decompression actuation delays are within a predetermined critical valve limit.

3. The monitoring system of claim 1, wherein the actuation delays include suction opening delays and discharge closure delays, and wherein the compression delay deviations include a first set of deviations between at least three of the suction opening delays and a second set of deviations between at least three of the discharge closure delays.

4. The monitoring system of claim 1, wherein the three or more strain gauges are positionable on an external surface of the fluid end of the pump, and wherein the three or more strain gauges includes at least a first strain gauge positionable on the fluid end to measure the strain in a first chamber of the three or more chambers, a second strain gauge positionable on the fluid end to measure the strain in a second chamber of the three or more chambers, and a third strain gauge positionable on the fluid end to measure the strain in a third chamber of the three or more chambers.

5. The monitoring system of claim 1, further including a position sensor positionable on a power end of the pump to sense a position of a member of a rotating assembly and generate a position signal representing the position of the member during operation of the pump, the position signal being usable in determining a position of a displacement member in each of three or more chambers in a fluid end of the pump,
    wherein the memory device further includes instructions that are executable by the processing device for causing the processing device to determine the actuation delays by correlating the position of the displacement member in each of the three or more chambers with the actuation points for the corresponding valves.

6. The monitoring system of claim 5, wherein the position sensor is positionable proximate to a path of the rotating assembly to determine the position of the member.

7. The monitoring system of claim 5, wherein the position sensor is positionable on a crankcase to determine a bolt pattern representing the position of the member.

8. The monitoring system of claim 1, wherein the memory device further includes instructions that are executable by the processing device for causing the processing device to detect cavitation in the pump based on the compression delay deviations.

9. A pumping system, comprising:
    a pump including a fluid end and a power end, the fluid end of the pump including three or more chambers, each of the three or more chambers having corresponding valves actuatable at corresponding actuation points that are measurable by corresponding strain gauges for each of the three or more chambers, each of the three or more chambers further having corresponding plungers, each of the corresponding plungers being mechanically coupled to a crankshaft in the power end of the pump and actuatable between a first reference point and a second reference point through a plunger transition between the first reference point and the second reference point; and
    a computing device couplable to the pump, the computing device including a processing device and a memory device, the memory device including instructions that are executable by the processing device for causing the processing device to:
        receive strain signals from the strain gauges corresponding to the three or more chambers;

determine actuation points corresponding to the valves in the three or more chambers by identifying discontinuities in the strain signals;

determine actuation delays based on the actuation points, wherein the actuation delays include at least a first actuation delay, a second actuation delay, and a third actuation delay; and compare the actuation delays to one another to identify delay deviations between any of the actuation delays, wherein the delay deviations include a first deviation between the first actuation delay and the second actuation delay, a second deviation between the second actuation delay and the third actuation delay, and a third deviation between the first actuation delay and the third actuation delay.

10. The pumping system of claim 9, wherein the delay deviations are compression delay deviations.

11. The pumping system of claim 10, wherein the actuation delays include suction opening delays and discharge closure delays, and wherein the compression delay deviations include a first set of deviations between at least three of the suction opening delays and a second set of deviations between at least three of the discharge closure delays.

12. The pumping system of claim 9, wherein the corresponding strain gauges are positionable on an external surface of the fluid end of the pump to measure strain in the three or more chambers, the corresponding strain gauges including at least a first strain gauge positionable on the fluid end to measure the strain in a first chamber of the three or more chambers and generate a first strain signal representing the strain in the first chamber, a second strain gauge positionable on the fluid end to measure the strain in a second chamber of the three or more chambers and generate a second strain signal representing the strain in the second chamber, and a third strain gauge positionable on the fluid end to measure the strain in a third chamber of the three or more chambers and generate a third strain signal representing the strain in the third chamber, and wherein the memory device further includes instructions that are executable by the processing device for causing the processing device to determine the actuation points for each of the corresponding valves by identifying discontinuities in the first strain signal, the second strain signal, and the third strain signal.

13. The pumping system of claim 9, wherein the first reference point and the second reference point are measurable by a position sensor couplable to the pump and the computing device, the position sensor being positionable on an external surface of the power end of the pump to sense a position of the crankshaft and generate a position signal corresponding to the position of the crankshaft.

14. The pumping system of claim 13, wherein the first reference point corresponds to a first plunger position and the second reference point corresponds to a second plunger position, a distance between the first plunger position and the second plunger position representing a full stroke length of the corresponding plungers for each of the three or more chambers, and wherein the memory device further includes instructions that are executable by the processing device for causing the processing device to determine the first reference point and the second reference point of the corresponding plungers based on the position signal.

15. The pumping system of claim 9, further comprising a display unit couplable to the computing device, and wherein the memory device further includes instructions that are executable by the processing device for causing the processing device to generate a graphical representation of the actuation delays for each of the corresponding valves.

16. The pumping system of claim 9, wherein the memory device further includes instructions that are executable by the processing device for causing the processing device to detect cavitation in the pump based on the delay deviations.

17. A method for identifying cavitation in a pump, comprising:

receiving, from each of three or more strain gauges coupled to an external surface of a fluid end of the pump, strain signals representing strain in each of three or more chambers of the pump;

determining, by a computing device, actuation points corresponding to an opening or a closing of valves in each of the three or more chambers by identifying discontinuities in the strain signals;

determining, by the computing device, compression actuation delays and decompression actuation delays for each of the valves using the actuation points, wherein the compression actuation delays include at least a first compression actuation delay, a second compression actuation delay, and a third compression actuation delay; and comparing, by the computing device, the compression actuation delays corresponding to each of the three or more chambers to identify deviations between any of the compression actuation delays, wherein the deviations include a first deviation between the first compression actuation delay and the second compression actuation delay, a second deviation between the second compression actuation delay and the third compression actuation delay, and a third deviation between the first compression actuation delay and the third compression actuation delay.

18. The method of claim 17, further comprising:

receiving, from a position sensor coupled to a power end of the pump, a position signal representing a position of a member of a rotating assembly of the pump; and determining, by the computing device, a position of corresponding displacement members operable in each of the three or more chambers, wherein determining the compression actuation delays and the decompression actuation delays includes correlating the position of the corresponding displacement members in each of the three or more chambers with the actuation points.

19. The method of claim 17, further comprising detecting cavitation in the pump based on the delay deviations.

* * * * *